(12) United States Patent
Caffrey

(10) Patent No.: US 9,772,895 B2
(45) Date of Patent: Sep. 26, 2017

(54) IDENTIFYING INTERVALS OF UNUSUAL ACTIVITY IN INFORMATION TECHNOLOGY SYSTEMS

(71) Applicant: INTERNATIONAL BUSINESS MACHINES CORPORATION, Armonk, NY (US)

(72) Inventor: James M. Caffrey, Woodstock, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 79 days.

(21) Appl. No.: 14/887,354

(22) Filed: Oct. 20, 2015

(65) Prior Publication Data

US 2017/0109221 A1   Apr. 20, 2017

(51) Int. Cl.
G06F 11/00 (2006.01)
G06F 11/07 (2006.01)

(52) U.S. Cl.
CPC ........ *G06F 11/0781* (2013.01); *G06F 11/008* (2013.01)

(58) Field of Classification Search
CPC . G06F 11/008; G06F 11/0781; G06F 11/0787
USPC ................................. 714/37, 47.1, 47.2, 47.3
See application file for complete search history.

(56) References Cited

U.S. PATENT DOCUMENTS

| | | | | |
|---|---|---|---|---|
| 6,754,854 B2* | 6/2004 | Kurrasch | ............ | G06F 11/0748 702/186 |
| 7,076,695 B2* | 7/2006 | McGee | ............... | G06F 11/0709 702/179 |
| 7,089,460 B2* | 8/2006 | Fu | ........... | G06F 11/073 707/999.202 |
| 7,526,670 B2* | 4/2009 | Lloyd | ................. | G06F 11/3447 714/4.1 |
| 8,200,797 B2 | 6/2012 | Meng et al. | | |
| 9,218,570 B2* | 12/2015 | Biem | .................... | G06N 5/046 |
| 2014/0310739 A1 | 10/2014 | Ricci et al. | | |
| 2014/0324409 A1* | 10/2014 | Ben Simhon | ....... | G06F 11/3447 703/22 |
| 2014/0358833 A1 | 12/2014 | Biem | | |

(Continued)

OTHER PUBLICATIONS

List of IBM Patents or Patent Applications Treated as Related; (Appendix P), Date Filed Mar. 14, 2016, 2 pages.

(Continued)

*Primary Examiner* — Joseph Kudirka
(74) *Attorney, Agent, or Firm* — Cantor Colburn LLP; Noah Sharkan

(57) ABSTRACT

Embodiments include method, systems and computer program products for identifying unusual intervals in an information technology (IT) system. Aspects include training a log analysis system based on historical data for the IT system, the historical data including a plurality of intervals each having an interval anomaly score and receiving status messages from a plurality of pieces of IT equipment in the IT system. Aspects also include grouping the status messages into an interval and calculating an interval anomaly score for the interval and comparing the interval anomaly score with one or more priority level cutoffs created by the training and responsively generating an alert based on the comparison, wherein the alert indicates that the interval is unusual.

11 Claims, 5 Drawing Sheets

(56) References Cited

U.S. PATENT DOCUMENTS

| | | |
|---|---|---|
| 2015/0100771 A1 | 4/2015 | Manchineni et al. |
| 2015/0213358 A1* | 7/2015 | Shelton ............... H04L 41/0604 |
| | | 706/47 |
| 2016/0004580 A1* | 1/2016 | Momot ............... H04L 63/1416 |
| | | 714/47.3 |
| 2016/0147583 A1* | 5/2016 | Ben Simhon ....... G06F 11/0721 |
| | | 714/47.3 |

OTHER PUBLICATIONS

U.S. Appl. No. 14/887,355, filed Oct. 20, 2015; Entitled: User Configurable Message Anomaly Scoring to Identify Unusual Activity in Information Technology Systems.

U.S. Appl. No. 15/065,907, filed Mar. 10, 2016; Entitled: Identifying Intervals of Unusual Activity in Information Technology Systems.

Ein-Dor et al., "Analytics for resiliency in the mainframe" IBM J. RES. & DEV. vol. 57, No. 5 Paper 8 Sep./Oct. 2013; pp. 8:1-8:5.

IBM zAWARE Guide "IBM System z Advanced Workload Analysis Reporter (IBM zAware)", planned to be available Jun. 26, 2015; 2 pgs.

List of IBM Patents or Patent Applications Treated as Related— Date Filed: Oct. 20, 2015; 2 pages.

U.S. Appl. No. 14/887,354, filed Oct. 20, 2015; Entitled: Identifying Intervals of Unusual Activity in Information Technology Systems.

\* cited by examiner

IDENTIFYING INTERVALS OF UNUSUAL ACTIVITY IN INFORMATION TECHNOLOGY SYSTEMS

BACKGROUND

The present disclosure relates to information technology (IT) systems, and more specifically, to methods, systems and computer program products for monitoring status messages in an IT system to identify intervals of unusual activity.

Today's complex IT systems, such as integrated data centers, require a team of experts to monitor various system messages for abnormal behavior, and to diagnose and fix anomalies before they result in systems failures and outages. In typical complex IT systems, the number of status messages created by the components of the IT system far exceed what can reasonably be read and analyzed by the team of IT experts. As a result, automated systems have been developed for reviewing and filtering these status messages.

Currently available automated systems for reviewing such status messages can be configured to calculate a score for messages. In some systems, the status messages are then grouped into intervals and a combined score is calculated for the interval. If the calculated score of an interval is greater than an arbitrarily fixed level, the interval is marked as being unusual. Once an interval is marked as unusual, the interval it is selected for further analysis by one of the systems experts.

SUMMARY

In accordance with an embodiment, a method for identifying unusual intervals in an IT system is provided. The method includes training a log analysis system based on historical data for the IT system, the historical data including a plurality of intervals each having an interval anomaly score. The method also includes receiving, by the log analysis system, status messages from a plurality of pieces of IT equipment in the IT system and grouping the status messages into an interval and calculating an interval anomaly score for the interval. The method further includes comparing the interval anomaly score with one or more priority level cutoffs created by the training and responsively generating an alert based on the comparison, wherein the alert indicates that the interval is unusual.

In accordance with another embodiment, a system for identifying unusual intervals in an IT system includes a processor in communication with one or more types of memory. The processor is configured to train a log analysis system based on historical data for the IT system, the historical data including a plurality of intervals each having an interval anomaly score and to receive status messages from a plurality of pieces of IT equipment in the IT system. The processor is also configured to group the status messages into an interval and calculating an interval anomaly score for the interval and to compare the interval anomaly score with one or more priority level cutoffs created by the training and responsively generating an alert based on the comparison, wherein the alert indicates that the interval is unusual.

In accordance with a further embodiment, a computer program product for identifying unusual intervals in an IT system includes a non-transitory storage medium readable by a processing circuit and storing instructions for execution by the processing circuit for performing a method. The method includes training a log analysis system based on historical data for the IT system, the historical data including a plurality of intervals each having an interval anomaly score. The method also includes receiving, by the log analysis system, status messages from a plurality of pieces of IT equipment in the IT system and grouping the status messages into an interval and calculating an interval anomaly score for the interval. The method further includes comparing the interval anomaly score with one or more priority level cutoffs created by the training and responsively generating an alert based on the comparison, wherein the alert indicates that the interval is unusual.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for identifying unusual intervals in an IT system are provided. In exemplary embodiments, a historical set of IT messages for an IT system is analyzed by identifying patterns in the historical set of message and the statistical behavior of messages. This information is then used to create an anomaly score for each message. The anomaly scores for each message within an interval are accumulated to create a cumulative score for the interval. A subsequent statistical analysis is performed on the cumulative scores and based on this statistical analysis, and input from an IT professional, one or more priority level cutoffs are determined. As new incoming status messages are received, they are grouped into intervals and an interval score is calculated. The calculated interval score is then compared to the one or more priority level cutoffs to determine if the interval should be marked as unusual.

Figure 1:
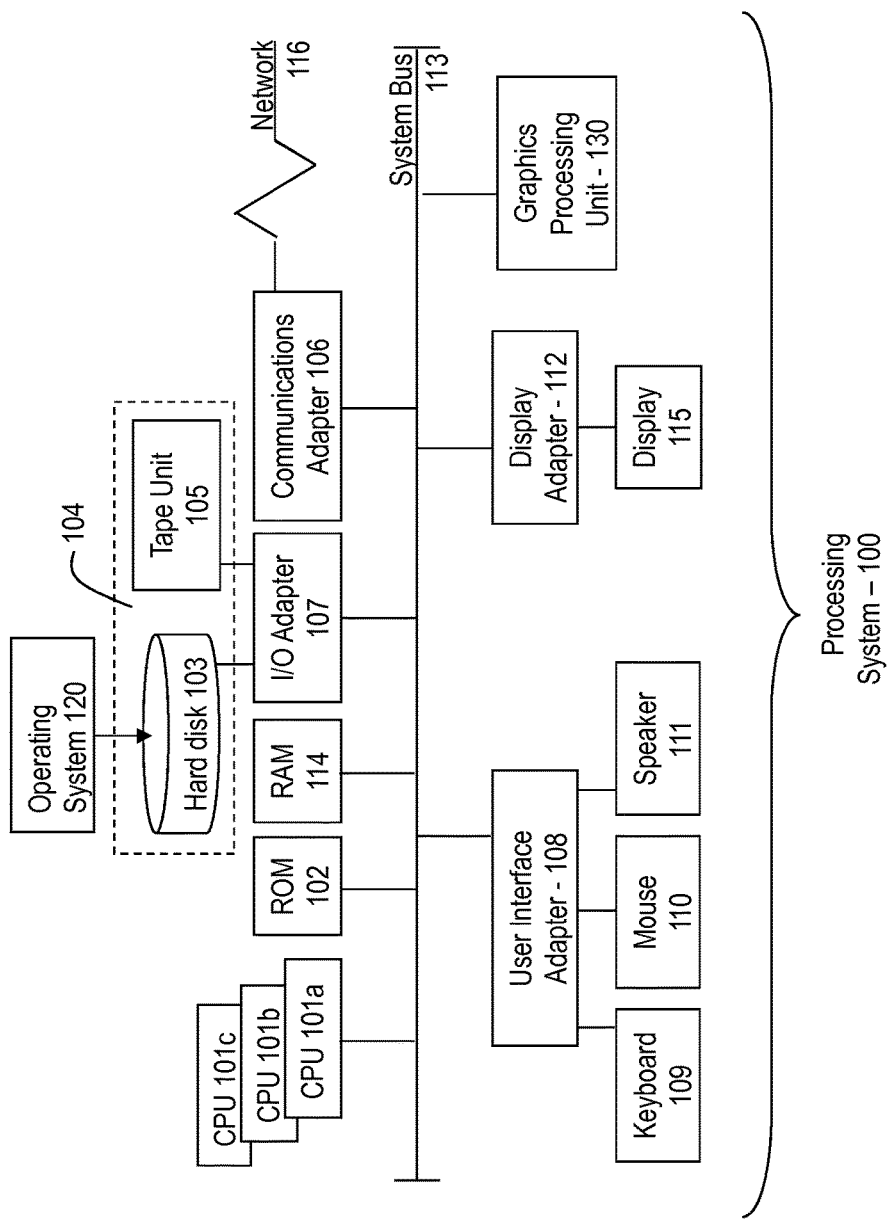
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
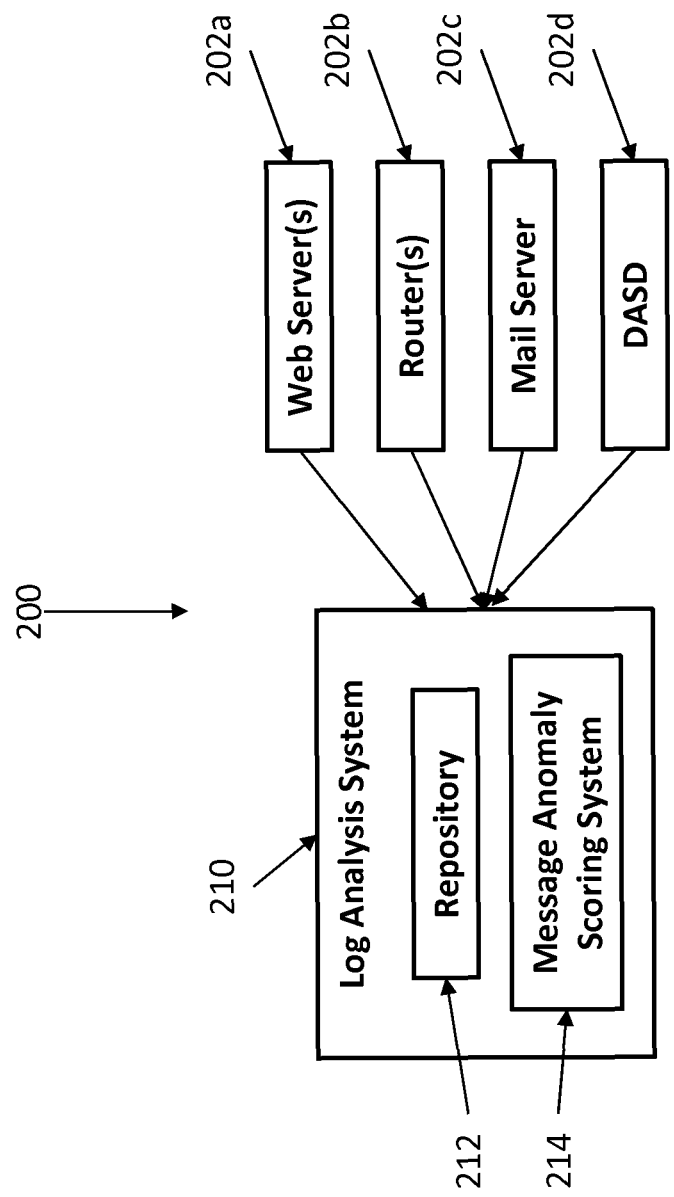
FIG. 2 is a block diagram illustrating an information technology system in accordance with an exemplary embodiment.

Referring now to FIG. 2, an information technology (IT) system 200 in accordance with an embodiment is illustrated. As illustrated, the IT system 200 includes a plurality of pieces of IT equipment 202 which may include, but are not limited to, a web server 202a, a router 202b, a mail server 202c and a direct access storage device (DASD) 202d. The IT system 200 also includes a log analysis system 210, which may be a processing system similar to the one shown in FIG. 1. The log analysis system 210 includes a repository 212 for storing status messages received from the plurality of pieces of IT equipment 202. In exemplary embodiments, the pieces of IT equipment 202 are configured to generate status messages during their operation and to transmit these status messages to the log analysis system 210. The log analysis system 210 receives the status messages from the plurality of pieces of IT equipment 202 and stores them in the repository 212.

The log analysis system 210 is configured to perform an analysis on the stored status messages to identify potential problems in the IT system 200. In one embodiment, the log analysis system 210 includes a message anomaly scoring system 214 that is configured to analyze each status message and to assign a message anomaly score to the message based on a set of rules or from a detailed statistical analysis of the message previous behavior. In another embodiment, the log analysis system 210 receives status messages from the pieces of IT equipment 202, which include an anomaly score. In exemplary embodiments, the log analysis system 210 receives status messages and stores the status messages in the repository 212 along with the message anomaly score for each message.

In currently available systems, the message anomaly scores are used by the log analysis system to generate alerts to IT experts to notify the IT experts of potential issues in the IT system 200. However, each IT system 200 is different and the IT professionals in charge of the various systems often have different tolerances for the risks of different types of failures to the IT systems. As a result, the number of alerts reviewed by the IT experts may often to too high, resulting in many false positives, or too low, resulting in potential unexpected failures. Accordingly, what is needed is a method of allowing the log analysis system to learn the appropriate value for the message anomaly scoring used by the log analysis system to generate alerts.

Figure 3:
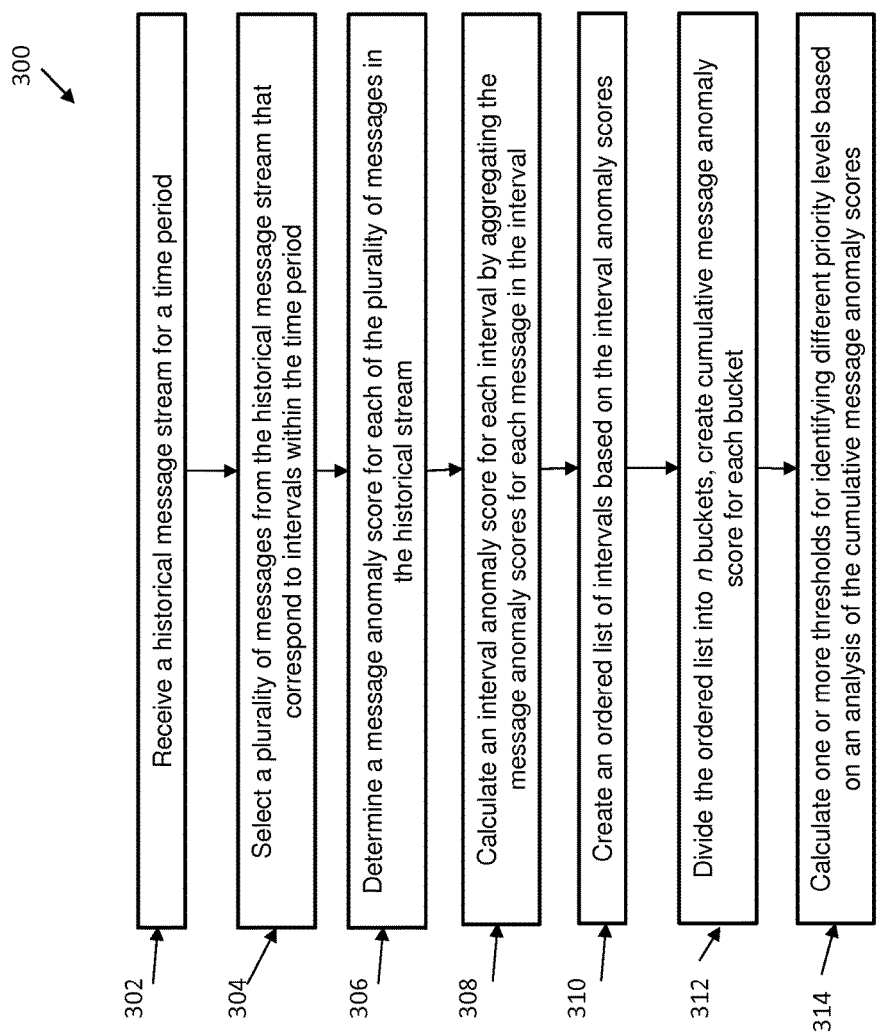
FIG. 3 is a flow diagram of a method for training an anomaly scoring system for identifying unusual activity in an information technology (IT) system in accordance with an exemplary embodiment.

Referring now to FIG. 3, a flow diagram of a method 300 for training an anomaly scoring system for identifying unusual activity in an information technology (IT) system in accordance with an exemplary embodiment is shown. As shown at block 302, the method 300 includes receiving a historical message stream for a time period. Next, as shown at block 304, the method 300 includes selecting a plurality of messages from the historical message stream that correspond to intervals within the time period. The method 300 also includes determining a message anomaly score for each message in the historical stream, as shown at block 306. In exemplary embodiments, the message anomaly score can be determined by applying known statistical analysis and calculations of patterns of message traffic. In other embodiments, the message anomaly score is generated by the piece of IT equipment that created the message and is included in the message.

The method 300 also includes calculating an interval anomaly score for each interval by aggregating the message anomaly scores for each message in the interval, as shown at block 308. Next, as shown at block 310, the method 300 includes creating an ordered list of intervals based on the interval anomaly scores. The method 300 also includes dividing the ordered list into n buckets and creating a cumulative message anomaly score for each bucket, as shown at block 312. In exemplary embodiments, the cumulative message anomaly score for each bucket is a sum of the interval anomaly scores for each interval assigned to a bucket. Next, as shown at block 314, the method 300 includes calculating one or more thresholds for identifying different priority levels based on an analysis of the cumulative message anomaly scores.

In exemplary embodiments, the one or more thresholds are calculated based on a statistical analysis of the cumulative message anomaly scores. In exemplary embodiments, when an IT system is stable, then number of intervals with large sum of message anomaly scores for the interval is quite small. However, in unstable IT systems the number of intervals with large sum of message anomaly scores of the interval is larger. Accordingly, depending on the type of IT system, the IT professional may select to use one of a variety of statistical methods to identify unusual intervals of activity in the IT system.

In one embodiment, the statistical analysis includes plotting a graph of the cumulative message anomaly scores and calculating the first derivative of the cumulative message anomaly scores. The statistical analysis also includes selecting a first interval that has a first derivative value that exceeds a threshold value and marking the lower end of the interval anomaly score range for that interval as a first priority level cutoff. For example, if the difference in the sum of the cumulative message anomaly scores for interval n and interval n−1 exceeds a threshold value, the interval n can be determined to an interval of interest. In exemplary embodiments, the threshold value may be selected to be a multiple of the average cumulative message anomaly score difference, wherein the multiple is set by an IT professional based on their preferences. Otherwise stated, assume $x_n$ is the cumulative message anomaly score for interval n, the average cumulative message anomaly score difference can be defined as $$\frac{\sum_n (x_n - x_{n-1})}{n}.$$

In another embodiment, the statistical analysis includes plotting a graph of the cumulative message anomaly scores and calculating the second derivative of the sum of the cumulative message anomaly score for interval n. The statistical analysis also includes calculating a mean and standard deviation of the second derivative and identifying the interval that corresponds to the second derivative exceeds the mean plus twice the standard deviation. The lower end of the interval anomaly score range for the identified interval is then marked a second priority level cutoff.

In another embodiment, the statistical analysis includes calculating a simple linear regression of the cumulative message anomaly scores to predict the sum of the cumulative message anomaly score for the interval using the percentile. The statistical analysis also includes select the largest interval that intersects the simple linear regression line and marking the lower end of the interval anomaly score range for that interval as a third priority level cutoff.

In exemplary embodiments, the above described statistical techniques can be used to identify unusual intervals based on an analysis of the interval details from training on historical data. As will be appreciated by those of ordinary skill in the art, these techniques can be used individually or in combination and other similar techniques may also be used.

In exemplary embodiments, the log analysis system can be configured to create alerts of potential issues in the IT system based on the interval anomaly score. Currently log analysis systems are configured with arbitrarily set default interval anomaly scores that are used to trigger alerts. However, as discussed above, each IT system is unique and the IT professionals in charge of the various systems often have different tolerances for the risks of different types of failures to the IT systems. As a result, the number of alerts reviewed by the IT experts may often to too high, resulting in many false positives, or too low, resulting in potential unexpected failures. Accordingly, what is needed is a method of identifying unusual intervals in an IT system based on a historical performance of the IT system. In exemplary embodiments, the log analysis system is configured to identify unusual intervals based on an analysis of the interval details from training on historical data.

Figure 4:
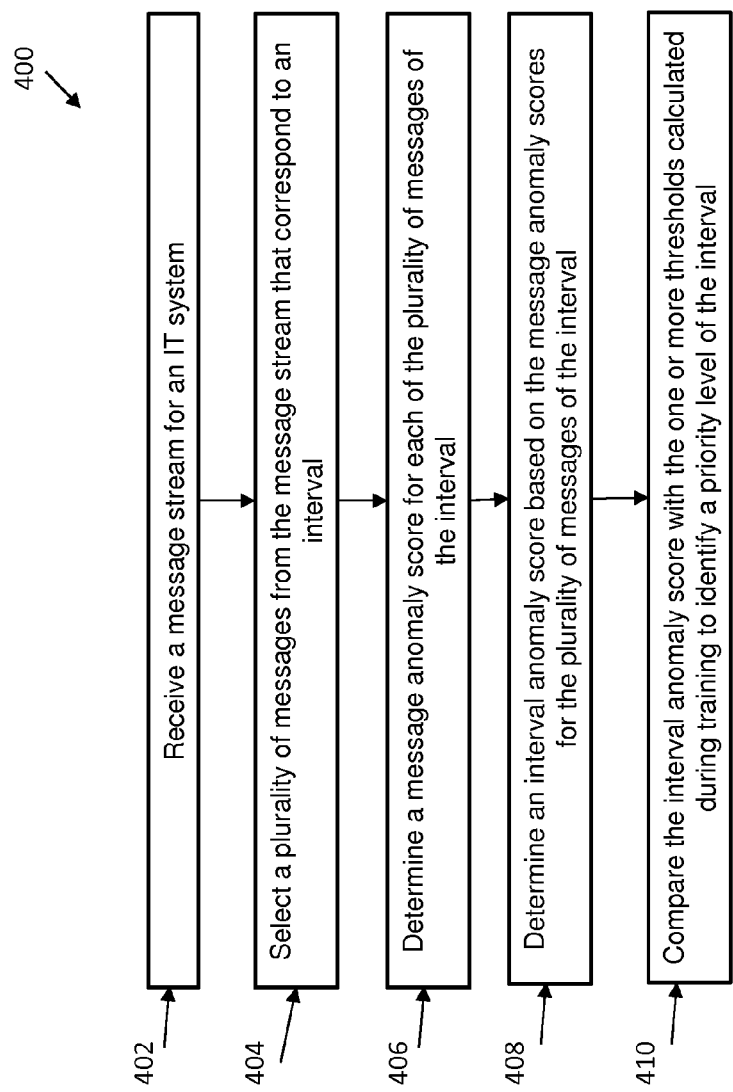
FIG. 4 is a flow diagram of a method for calculating an interval anomaly score in an information technology (IT) system based on a trained anomaly scoring system in accordance with an exemplary embodiment.

Referring now to FIG. 4, a flow diagram of a method 400 for calculating an interval anomaly score in an information technology (IT) system based on a trained anomaly scoring system in accordance with an exemplary embodiment is shown. As shown at block 402, the method 400 includes receiving a message stream for the IT system. Next, as shown at block 404, the method 400 includes selecting a plurality of messages from the message stream that correspond to an interval. The method 400 also includes determining a message anomaly score for each message in the interval, as shown at block 406. In exemplary embodiments, the message anomaly score can be determined by applying known statistical analysis and calculations of patterns of message traffic. In other embodiments, the message anomaly score is generated by the piece of IT equipment that created the message and is included in the message.

After the message anomaly score has been created, the method 400 includes determining an interval anomaly score based on the message anomaly scores for the plurality of messages of the interval, as shown at block 408. In exemplary embodiments, the interval anomaly score is the sum of the message anomaly scores for the plurality of messages of the interval. Next, as shown at block 410, the method 400 includes comparing the interval anomaly score with the one or more thresholds calculated during training to identify a priority level of the interval. In exemplary embodiments, the one or more thresholds are calculated by training the anomaly scoring system, such as by the method shown in FIG. 3.

Figure 5:
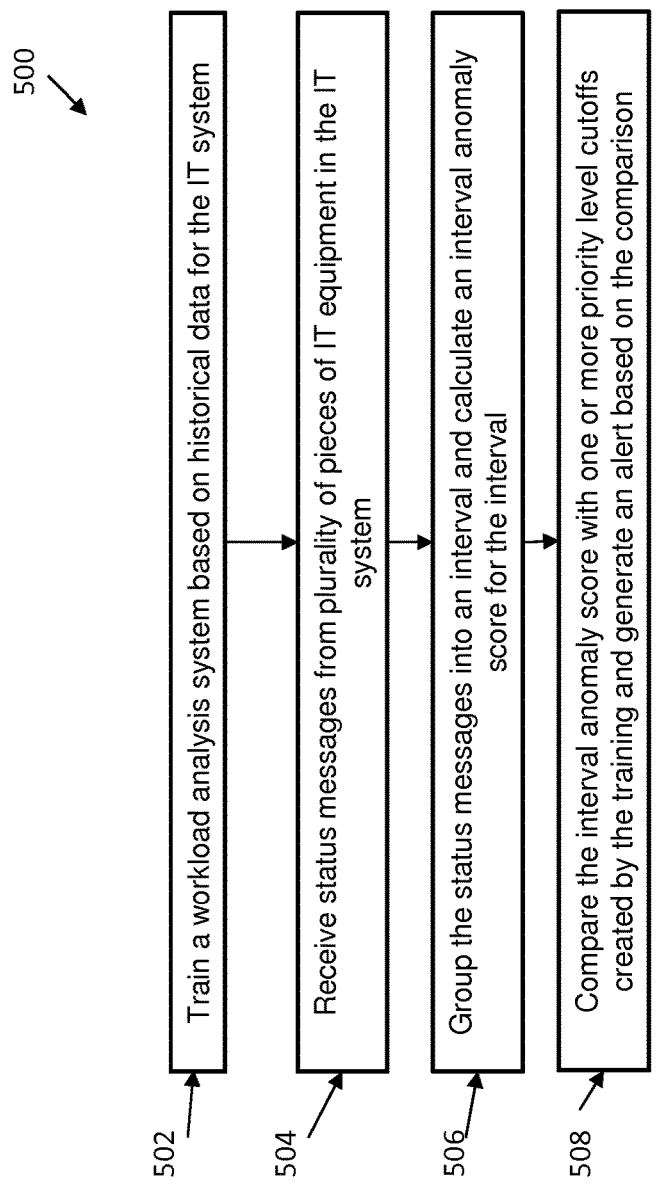
FIG. 5 is a flow diagram of a method for identifying unusual intervals in an IT system in accordance with an exemplary embodiment.

Referring now to FIG. 5, a flow chart diagram of a method for identifying unusual intervals in an IT system in accordance with an exemplary embodiment is shown. As shown at block 502, the method 500 includes training a log analysis system based on historical data for the IT system. Next, shown at block 504, the method 500 includes receiving, by the log analysis system, status messages from a plurality of pieces of IT equipment in the IT system. In exemplary embodiments, the IT messages may include, or may be assigned by the log analysis system, an anomaly score. The method 500 also includes grouping the status messages into an interval and calculating an interval anomaly score for the interval, as shown at block 506. Next, as shown at block 508, the method 500 includes comparing the interval anomaly score with one or more priority level cutoffs created by the training and generating an alert based on the comparison.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for identifying unusual intervals in an information technology (IT) system, the computer program product comprising:
   a non-transitory storage medium readable by a processing circuit and storing instructions for execution by the processing circuit for performing a method comprising:
   training, by a processor, a log analysis system based on historical data for the IT system, the historical data including a plurality of intervals each having an interval anomaly score, wherein the training comprises:
      ordering the plurality of intervals in ascending order based on the interval anomaly scores:
      dividing the ordered intervals evenly into a fixed number of groups; and
      calculating a cumulative anomaly score for each of the groups;
   receiving, by the log analysis system, status messages from a plurality of pieces of IT equipment in the IT system;
   grouping the status messages into an interval and calculating an interval anomaly score for the interval; and
   comparing the interval anomaly score with one or more priority level cutoffs created by the training and responsively generating an alert based on the comparison, wherein the alert indicates that the interval is unusual.

2. The computer program product of claim 1, wherein the training further comprises calculating the one or more priority level cutoffs based on a statistical analysis of the cumulative anomaly scores.

3. The computer program product of claim 2, wherein the statistical analysis of the cumulative anomaly scores includes plotting a graph of the cumulative anomaly scores and calculating a first derivative of the cumulative anomaly scores.

4. The computer program product of claim 2, wherein the statistical analysis of the cumulative anomaly scores includes plotting a graph of the cumulative message anomaly scores and calculating a second derivative of a sum of the cumulative message anomaly score for interval n.

5. The computer program product of claim 2, wherein the statistical analysis of the cumulative anomaly scores includes calculating a linear regression of the cumulative message anomaly scores to predict a sum of the cumulative message anomaly score for an interval.

6. The computer program product of claim 1, wherein the one or more priority level cutoffs are further based on a user input.

7. A system for identifying unusual intervals in an information technology (IT) system, comprising:
   a processor in communication with one or more types of memory, the processor configured to:
   train a log analysis system based on historical data for the IT system, the historical data including a plurality of intervals each having an interval anomaly score, wherein the training comprises:
      ordering the plurality of intervals in ascending order based on the interval anomaly scores:
      dividing the ordered intervals evenly into a fixed number of groups; and
      calculating a cumulative anomaly score for each of the groups;
   receive status messages from a plurality of pieces of IT equipment in the IT system;
   group the status messages into an interval and calculating an interval anomaly score for the interval; and
   compare the interval anomaly score with one or more priority level cutoffs created by the training and responsively generating an alert based on the comparison, wherein the alert indicates that the interval is unusual.

8. The system of claim 7, wherein the training further comprises calculating the one or more priority level cutoffs based on a statistical analysis of the cumulative anomaly scores.

9. The system of claim 8, wherein the statistical analysis of the cumulative anomaly scores includes plotting a graph of the cumulative anomaly scores and calculating a first derivative of the cumulative anomaly scores.

10. The system of claim 8, wherein the statistical analysis of the cumulative anomaly scores includes plotting a graph of the cumulative message anomaly scores and calculating a second derivative of a sum of the cumulative message anomaly score for interval n.

11. The system of claim 8, wherein the statistical analysis of the cumulative anomaly scores includes calculating a linear regression of the cumulative message anomaly scores to predict a sum of the cumulative message anomaly score for an interval.

* * * * *